(12) United States Patent
Xu

(10) Patent No.: US 11,372,704 B2
(45) Date of Patent: Jun. 28, 2022

(54) ADVANCED JAVA DUMP ANALYSIS

(71) Applicant: International Business Machines Corporation, Armonk, NY (US)

(72) Inventor: Jijiang Xu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/241,338

(22) Filed: Jan. 7, 2019

(65) Prior Publication Data

US 2020/0218592 A1 Jul. 9, 2020

(51) Int. Cl.
*G06F 11/00* (2006.01)
*G06F 11/07* (2006.01)
*G06F 3/048* (2013.01)
*G06F 3/12* (2006.01)

(52) U.S. Cl.
CPC .......... *G06F 11/0778* (2013.01); *G06F 3/048* (2013.01); *G06F 3/1246* (2013.01); *G06F 11/0769* (2013.01); *G06F 11/0775* (2013.01)

(58) Field of Classification Search
CPC ............... G06F 11/0778; G06F 11/321; G06F 16/9577; G06F 11/0769; G06F 3/1246
See application file for complete search history.

(56) References Cited

U.S. PATENT DOCUMENTS

| | | | | |
|---|---|---|---|---|
| 5,999,933 A * | 12/1999 | Mehta | ................ | G06F 11/366 |
| 7,543,187 B1 * | 6/2009 | Madan | ................ | G06F 11/0778 714/1 |
| 8,601,323 B2 * | 12/2013 | Tsantilis | ................ | G06F 11/366 714/42 |
| 9,400,810 B2 * | 7/2016 | Carlson | ................ | G06F 3/048 |
| 9,916,137 B2 * | 3/2018 | Chouhan | ................ | G06F 9/547 |
| 10,169,130 B2 * | 1/2019 | Addison | ............ | G06F 11/0775 |
| 10,242,078 B2 * | 3/2019 | Nguyen | .............. | G06F 16/1794 |
| 10,528,411 B2 * | 1/2020 | Kucera | .............. | G06F 11/0778 |
| 10,891,181 B2 * | 1/2021 | Paruthi | .............. | G06F 11/0751 |
| 2002/0156813 A1 * | 10/2002 | Gardner | ................ | G06F 40/151 715/234 |
| 2004/0143717 A1 * | 7/2004 | Cantrill | ................ | G06F 11/366 711/173 |
| 2004/0230763 A1 * | 11/2004 | Cohen | ................ | G06F 11/3466 711/170 |
| 2005/0283585 A1 * | 12/2005 | Sexton | .................. | G06F 11/366 711/171 |
| 2008/0126301 A1 * | 5/2008 | Bank | ................ | G06F 11/366 |

(Continued)

FOREIGN PATENT DOCUMENTS

WO 2017201057 11/2017

*Primary Examiner* — Loan L. T. Truong
(74) *Attorney, Agent, or Firm* — VanLeeuwen & VanLeeuwen; Christopher M. Pignato

(57) ABSTRACT

An approach is provided in which an information handling system identifies a data type description corresponding a view selection initiated by a user. The view selection is selected from multiple view selections and corresponds to a set of dump data generated by a dump event. The information handling system locates a set of candidate data in the set of dump data based on the data type description and converts the set of candidate data into a set of markup language representations. In turn, the information handling system displays the set of markup language representations to the user on a display.

17 Claims, 9 Drawing Sheets

(56) References Cited

U.S. PATENT DOCUMENTS

| | | | |
|---|---|---|---|
| 2009/0063651 A1* | 3/2009 | Brahmavar | G06F 11/0709 709/212 |
| 2011/0067007 A1* | 3/2011 | Zamarreno | G06F 11/3476 717/128 |
| 2012/0151278 A1* | 6/2012 | Tsantilis | G06F 11/366 714/48 |
| 2014/0046948 A1* | 2/2014 | Evans | G06F 16/972 707/740 |
| 2014/0122941 A1 | 5/2014 | Pan et al. | |
| 2014/0258785 A1* | 9/2014 | Burghard | G06F 11/0709 714/38.11 |
| 2016/0055043 A1* | 2/2016 | Chikabelapur | G06F 11/079 714/37 |
| 2016/0154701 A1* | 6/2016 | Desai | G06F 11/0793 714/19 |
| 2017/0235627 A1* | 8/2017 | Rasor | G06F 11/0778 714/45 |
| 2017/0277760 A1* | 9/2017 | Nguyen | G06F 16/258 |
| 2017/0371735 A1 | 12/2017 | Gadi et al. | |
| 2017/0371765 A1* | 12/2017 | Gadi | G06F 11/366 |
| 2018/0060150 A1 | 3/2018 | Cunico et al. | |
| 2018/0107723 A1* | 4/2018 | Xu | G06F 11/079 |
| 2018/0260270 A1* | 9/2018 | Kucera | G06F 11/0778 |
| 2019/0121624 A1* | 4/2019 | Al-Hagri | G06F 8/4434 |
| 2020/0104400 A1* | 4/2020 | Obert | G06F 16/2246 |

\* cited by examiner

360 ⟶

| Current Activities – HTTP View ||||
|---|---|---|---|
| Start Time | Elapsed Time | Thread Info | Operation |
| Thu Oct 11 08:59:55.745 CEST 2018 | 674052 | Default Executor-thread-8440 (alive:runnable) [qs](Tracking,Request) | POST /bi/v1/metadata/modules/ iBF42E59A734B433C89A5A8EB7DFF3142/ metadata |
| Thu Oct 11 08:59:55.745 CEST 2018 | 988052 | Default Executor-thread-8441 (alive:object wait:waiting:waiting Indefinitely) [was](Tracking,Request) | GET /dataset-service/v1/datasets/service-status HTTP/1.1 User-Agent: Jakarta Commons-HttpClient/3.1 Host: cog-tst02.elkjop.int:9301 |
| Thu Oct 11 08:48:42.000 CEST 2018 | 1299052 | Default Executor-thread-6501 (alive:object wait:waiting:waiting Indefinitely) [xqe](Tracking,Request) | GET /dataset-service/v1/metadata/service-status HTTP/1.1 User-Agent: Jakarta Commons-HttpClient/3.1 Host: cog-tst02.elkjop.int:9301 |
| Thu Oct 11 08:43:28.000 CEST 2018 | 687052 | Default Executor-thread-8313 (alive:object wait:waiting:waiting Indefinitely) [xqe](Tracking,Request | GET /dataset-service/v1/otherdata/service-status HTTP/1.1 User-Agent: Jakarta Commons-HttpClient/3.1 Host: cog-tst02.elkjop.int:9301 |
| Thu Oct 11 08:59:55.745 CEST 2018 | 718052 | Default Executor-thread-8298 (alive:object wait:waiting:waiting Indefinitely) [qs](Tracking,Request) | GET /bi/v1/metadata/modules/ iBF42E59A734B433C89A5A8EB7DFF3142/ metadata?shortIdForExpression=true&item= on&type=module |

| \multicolumn{4}{c}{Current Activities – SQL View} |

| Start Time | Elapsed Time | Thread Info | Operation |
|---|---|---|---|
| Thu Oct 11 08:59:55.745 CEST 2018 | 674052 | Default Executor-thread-8440 (alive:runnable) [qs](Tracking,Request) | SELECT NON EMPTY {[Measures].[Measures].[Dimensional view - Sales Realtime_Sales Realtime_Budget Revenue excl. VAT incl Commision]} DIMENSION PROPERTIES PARENT_LEVEL, PARENT_UNIQUE_NAME ON AXIS(0)\u000aFROM [iBF42E59A734B433C89A5A8EB7DFF3142] CELL PROPERTIES CELL_ORDINAL, FORMAT_STRING, |
| Thu Oct 11 08:59:55.745 CEST 2018 | 988052 | Default Executor-thread-8441 (alive:object wait:waiting:waiting Indefinitely) [was](Tracking,Request) | SELECT NON EMPTY {[Measures].[Measures].[Dimensional view - Sales Realtime_Sales Realtime_Budget Revenue excl. VAT incl Commision]} DIMENSION PROPERTIES PARENT_LEVEL, PARENT_UNIQUE_NAME ON AXIS(0)\u000aFROM [iBF42E59A734B433C89A5A8EB7DFF3142] CELL PROPERTIES CELL_ORDINAL, FORMAT_STRING, |
| Thu Oct 11 08:48:42.000 CEST 2018 | 1299052 | Default Executor-thread-6501 (alive:object wait:waiting:waiting Indefinitely) [xqe](Tracking,Request) | SELECT NON EMPTY CROSSJOIN(ORDER([Dimensional view - Sales Realtime_Organisation_By Main Chain].[By Main Chain].[Main Chain].MEMBERS, NULL, BASC), {[Measures].[Measures].[Dimensional view - Sales Realtime_Sales Realtime_Revenue excl. VAT incl Commision], [Measures].[Measures].[Dimensional vi |
| Thu Oct 11 08:43:28.000 CEST 2018 | 687052 | Default Executor-thread-8313 (alive:object wait:waiting:waiting Indefinitely) [xqe](Tracking,Request | SELECT NON EMPTY CROSSJOIN(ORDER([Dimensional view - Sales Realtime_Organisation_By Main Chain].[By Main Chain].[Main Chain].MEMBERS, NULL, BASC), {[Measures].[Measures].[Dimensional view - Sales Realtime_Sales Realtime_Revenue excl. VAT incl Commision], [Measures].[Measures].[Dimensional vi |
| Thu Oct 11 08:59:55.745 CEST 2018 | 718052 | Default Executor-thread-8298 (alive:object wait:waiting:waiting Indefinitely) [qs](Tracking,Request) | SELECT NON EMPTY CROSSJOIN(ORDER([Dimensional view - Sales Realtime_Organisation_By Main Chain].[By Main Chain].[Main Chain].MEMBERS, NULL, BASC), {[Measures].[Measures].[Dimensional view - Sales Realtime_Sales Realtime_Revenue excl. VAT incl Commision], [Measures].[Measures].[Dimensional vi |

Data Type Description 900

```
<Rules>
    <Rule Description="CompanyX Drive" View="SQL" Product="ProductX">
        <ClassNames>
            <ClassName>productX.driver.T4CPreparedStatement</ClassName>
            <ClassName>productX.driver.productXSql</ClassName>
        </ClassNames>
        <Atrributes>
            <Atrribute>processedSql</Atrribute>
            <Atrribute>value</Atrribute>
        </Atrributes>
        <Processor>DataFormatter</Processor>
    </Rule>                                                                    — 910
    <Rule Description="CompanyYDriver" View="SQL" Product="ProductY">
        <ClassNames>
            <ClassName>productX.SQLServerStatement</ClassName>
        </ClassNames>
        <Atrributes>
            <Atrribute>currentCommand </Atrribute>
            <Atrribute>sql</Atrribute>
        </Atrributes>
        <Processor>DataFormatter</Processor>
    </Rule>                                                                    — 920
</Rules>
```

FIG. 9

ADVANCED JAVA DUMP ANALYSIS

BACKGROUND

Analyzing Java dump files generated from a Java heap dump or Java system dump is a challenge without having product source code knowledge. A heap dump is a snapshot of all objects in a virtual machine at a certain point in time, such as in a Java Virtual Machine (JVM) heap. A system dump consists of all the memory that is being used by the virtual machine.

System dumps allow administrators to view the state of a virtual machine at the time of a crash and identify issues. System dump files, however, are typically very large because they contain information pertaining to all of the memory used by the virtual machine process. Although the system dump includes more information than the heap dump, both dumps include valuable information that allow an administrator to determine, for example, a cause of a memory exhaustion, resource starvation, system or user exception, crash, dead lock, slow performing system, and etcetera.

A number of tools are currently available that allow developers to investigate data structure thread stacks and data from a Java dump. These tools are helpful for product developers to conveniently diagnose application problems causing the dump event. However, a system administrator or a support analyst has difficulty utilizing the current tools to identify problems without having a product developer's assistance. In addition, data structures in a dump file are typically shown in a primitive manner, which a system administrator or a support analyst does not understand.

BRIEF SUMMARY

According to one embodiment of the present disclosure, an approach is provided in which an information handling system identifies a data type description corresponding a view selection initiated by a user. The view selection is selected from multiple view selections and corresponds to a set of dump data generated by a dump event. The information handling system locates a set of candidate data in the set of dump data based on the data type description and converts the set of candidate data into a set of markup language representations. In turn, the information handling system displays the set of markup language representations to the user on a display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) identifying a data type description corresponding a view selection initiated by a user, wherein the view selection is selected from a plurality of view selections and corresponds to a set of dump data generated by a dump event; (ii) locating a set of candidate data in the set of dump data based on the data type description; (iii) converting the set of candidate data into a set of markup language representations; and (iv) displaying the set of markup language representations to the user on a display.

Some embodiments of the present invention may include one, or more, of the following features, characteristics, advantages and/or operations: (i) provides a new perspective of a Java system dump, so a developer or support analyst can flip the lenses (dimension) to see different side of Java dump; (ii) for example, in some embodiments the tool can show people activities using: (a) SQL from a database perspective, and/or (b) SOAP message from a Cognos perspective; (iii) provides a greatly simplified "bird's eye view" of a complex system, helping to identify issues much more efficiently; and/or (iv) provides a bird's eye view of the system using different dimensions.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary diagram depicting an HTTP (HyperText Transfer Protocol) view;

FIG. 8 is an exemplary diagram depicting an SQL (Structured Query Language) view; and FIG. 9 is an exemplary diagram depicting a data type description with rules.

DETAILED DESCRIPTION

Figure 1:
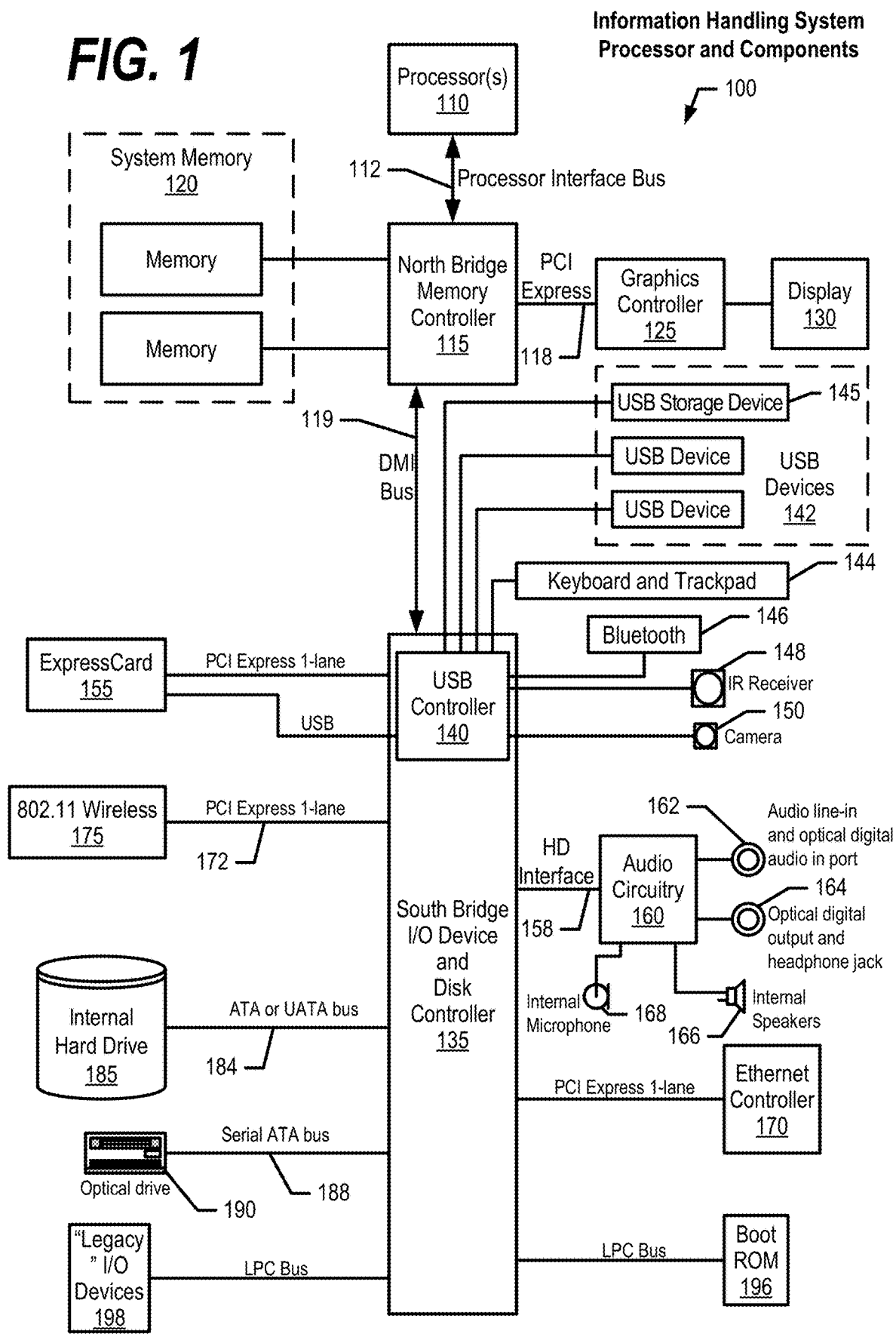
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
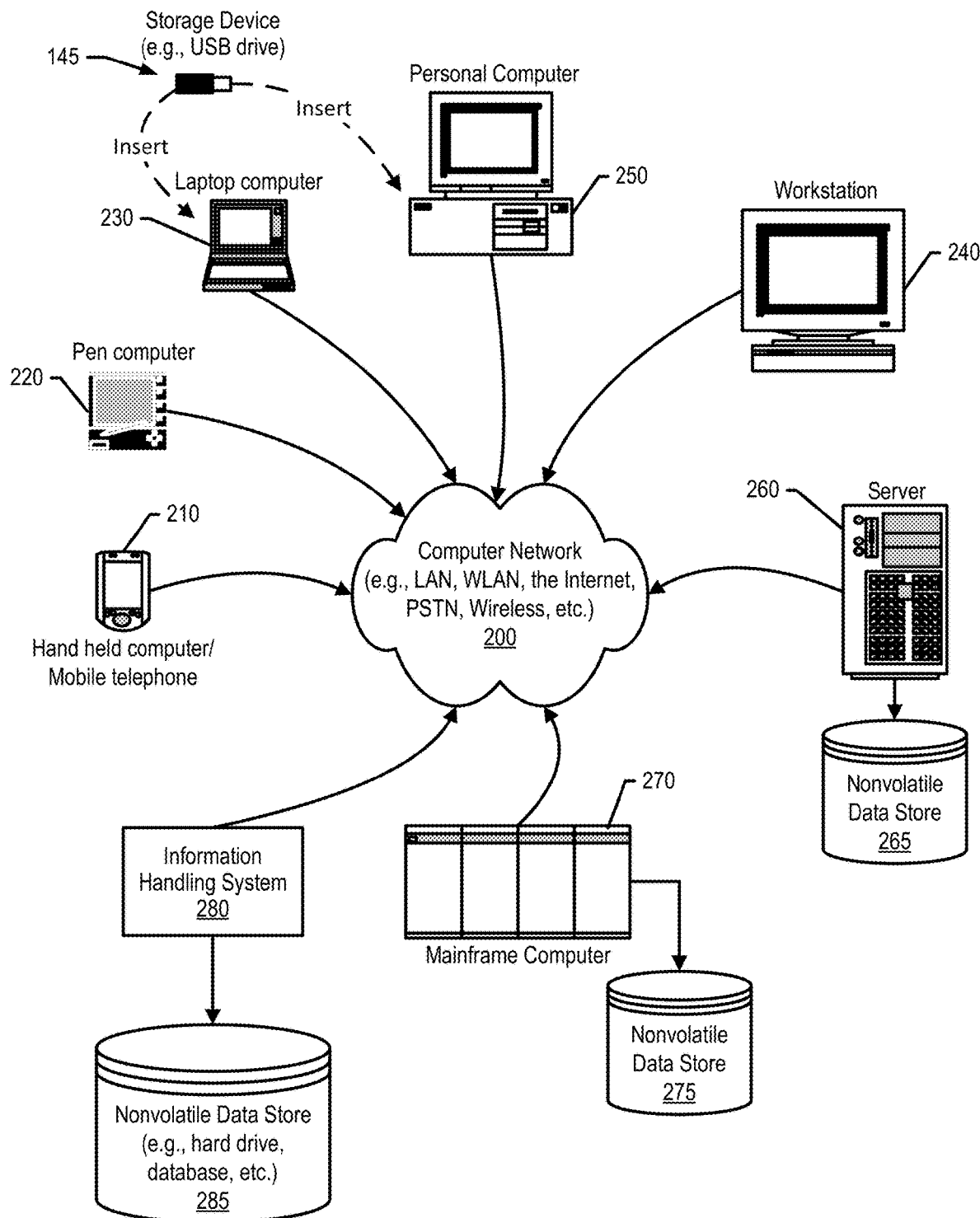
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, current debug tools present data structures in a primitive manner and require a developer's assistance to debug system issues. FIGS. 3 through 8 disclose an approach implemented by an information handling system that displays multiple user-friendly views of a dump file based on a user's view selection. The approach allows a user to view dump file information based on the user's expertise, such as HTTP (HyperText Transfer Protocol) views, SQL (Structured Query Language) views, SOAP (Simple Object Access Protocol) views, and RESTAPI (Representational State Transfer Application Protocol Interface (API)) views. In one embodiment, the approach supports multiple forms of requests in the same dump file call stack. For example, an HTTP request can lead to an internal SOAP/RESTAPI request that, in turn, leads to a SQL request in the very same thread. In this example, the approach discussed herein displays the different requests in different views.

Figure 3:
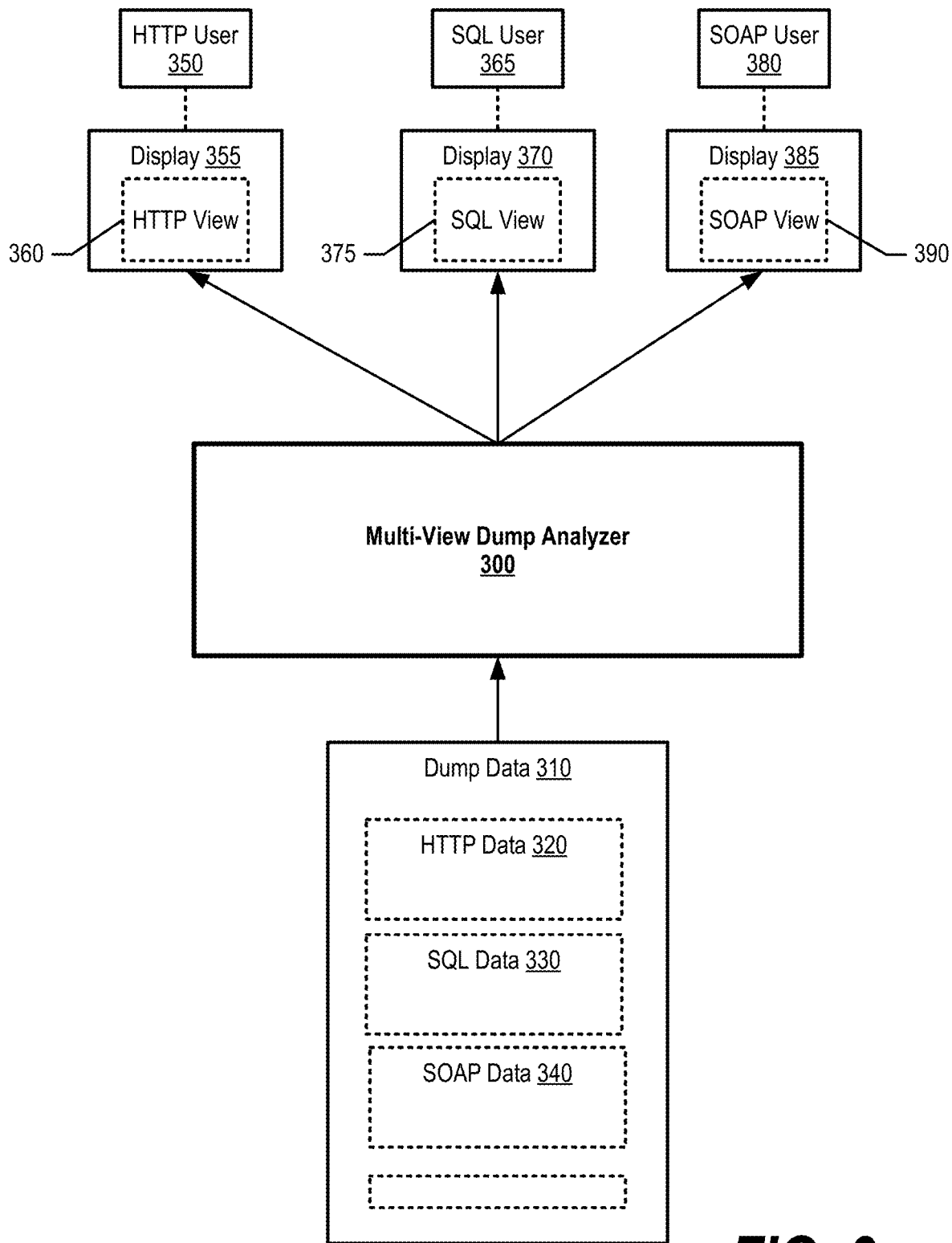
FIG. 3 is a high-level diagram depicting a multi-view dump analyzer providing different views of a dump file based on the user's view selection.

FIG. 3 is a high-level diagram depicting a multi-view dump analyzer providing different views of dump data based on the user's view selection.

Multi-view dump analyzer 300 receives dump data 310, which is a copy of the contents of a virtual machine's memory at a particular time. Dump data 310, such as a heap dump or system dump, is invoked by a request from a user or a session that includes operations, parameters and options. FIG. 3 shows different data types organized separately for simplicity purposes (HTTP data 320, SQL data 330, and SOAP data 340). In one embodiment, the different data types are interspersed and/or embedded in different threads and/or objects.

Multi-view dump analyzer 300 receives requests from users 350, 365, and 380 to view information in dump data 310. Each of the users has a different field of expertise and requests different views of dump data 310, such as through user interface 400 shown in FIG. 4. In turn, as discussed in detail below, multi-view dump analyzer 300 locates candidate data corresponding to the users' requests, converts the candidate data into a viewable format, and provides the viewable data to users 350, 365, and 380 in a standard markup language view that allows the requests to be viewed and understood by the different users.

HTTP user 350 requests to view data in dump data 310 that includes HTTP data (HTTP data 320), such as a request from a browser "click." As such, multi-view dump analyzer 300 proceeds through a series of steps discussed herein to create HTTP view 360 that includes HTTP data 320 as a markup representation and displays HTTP view 360 on display 355 (see FIG. 7 and corresponding text for further details).

SQL user 365 requests to view data in dump data 310 that includes SQL data (SQL data 330), such as when a user runs a report against a relational data source. As such, multi-view dump analyzer 300 proceeds through a series of steps discussed herein to create SQL view 375 that includes SQL data 330 as a markup representation and displays SQL view 375 on display 370 (see FIG. 8 and corresponding text for further details).

SOAP user 380 requests to view data in dump data 310 that includes SOAP data (SOAP data 340), such as in a SOAP implementation architecture, (e.g., a Cognos BI (Business Intelligence) platform). As such, multi-view dump analyzer 300 proceeds through a series of steps discussed herein to create SOAP view 390 as a markup representation that includes SOAP data 340 and displays SOAP view 390 on display 385.

In one embodiment, with the ability to see system operation from different views, a system administrator/support analyst can see overall system user behaviors very quickly without the need to investigate each individual thread. The system administrator/support analyst may also use the approach as a starting point to dive into thread detail if needed. For example, the system administrator/support analyst investigates when all operations are running the same SQL or similar tables are involved in an SQL. In this embodiment, if the SQLs are similar, the system administrator/support analyst is suspicious that that the system is not properly queued or external locking prevents these activities from completing, such as when an application not designed properly.

Figure 4:
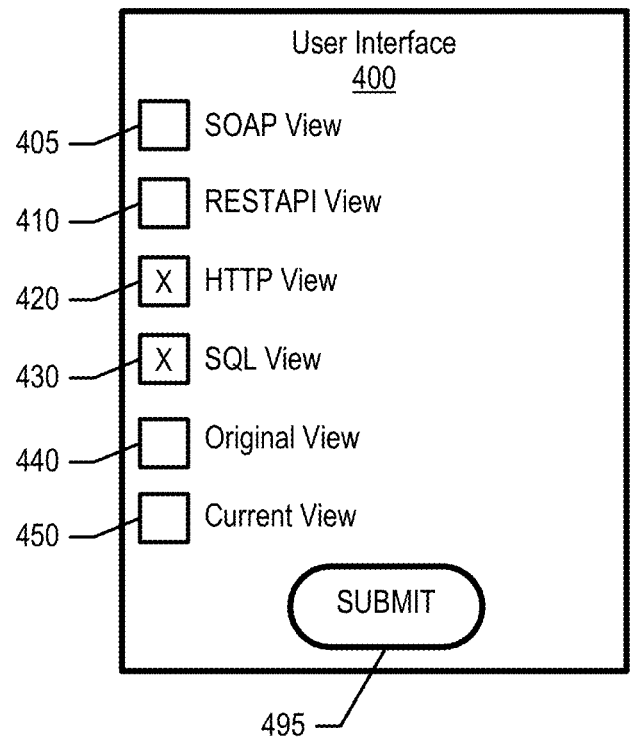
FIG. 4 is an exemplary diagram depicting a user interface for a user to select a view.

FIG. 4 is an exemplary diagram depicting a user interface for a user to select a view. Multi-view dump analyzer 300 provides a user interface to a user, such as user interface 400, which allows the user to request a particular view of dump data. User interface includes boxes 405, 410, 420, 430, 440, and 450, each of which corresponding to different views. The user selects one or more of the boxes to request the corresponding view from multi-view dump analyzer 300. Original view 440 selects an original view of a request, which is a request that initiated the thread, or a request that triggered the thread. Current view 450 selects a current view of the requests going to an external process, or other threads, and corresponds to the last request during the life cycle of a thread stack. The user selects submit button 495 to send the request to multi-view dump analyzer 300.

Figure 5:
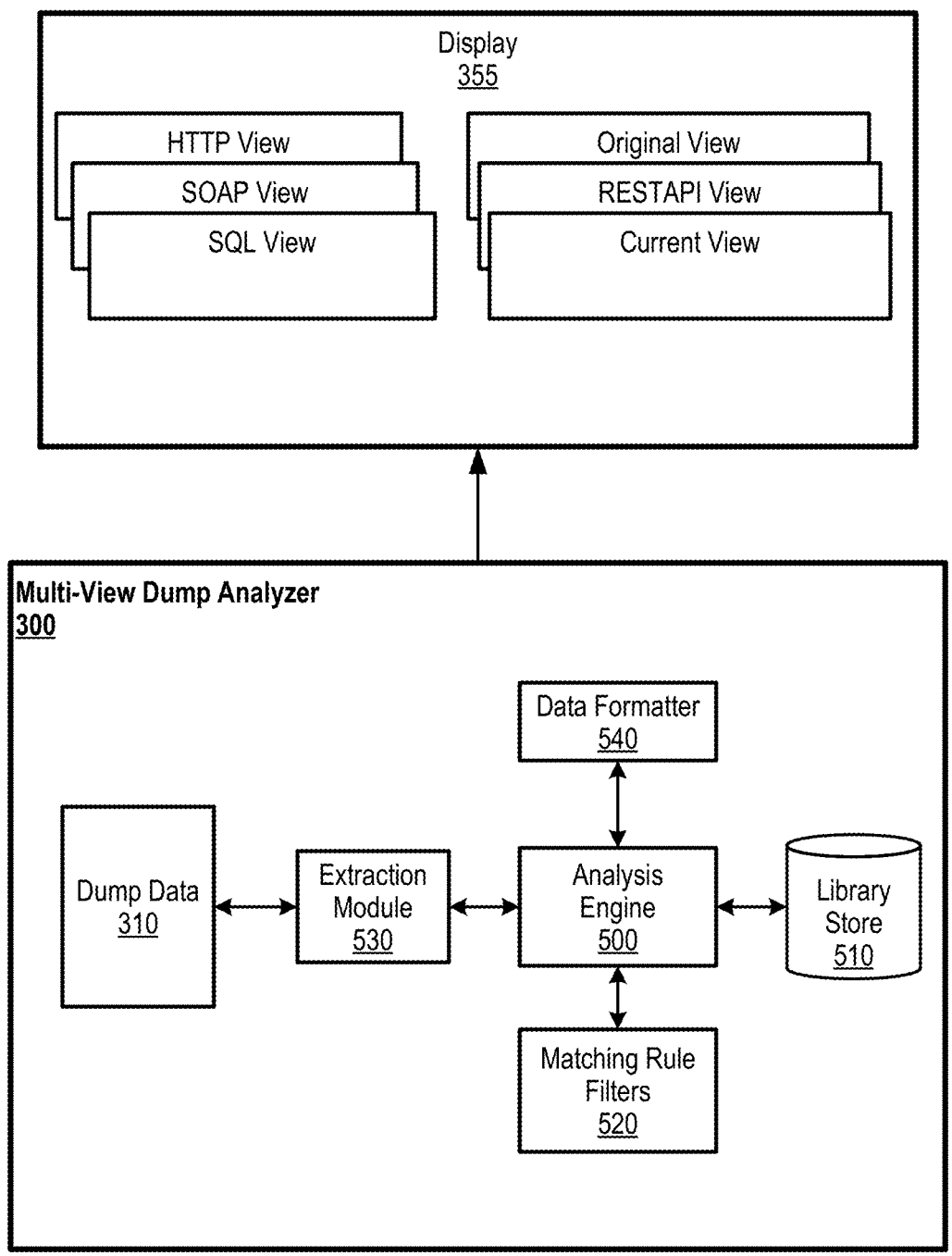
FIG. 5 is a diagram showing a multi-view dump analyzer traversing a dump file to locate and display pertinent information corresponding to a user's view selection.

FIG. 5 is a diagram showing a multi-view dump analyzer traversing dump data to locate and display pertinent information corresponding to a user's view selection. Multi-view dump analyzer 300 includes analysis engine 500, library store 510, matching rule filters 520, extraction module 530, and data formatter 540. Multi-view dump analyzer 300 operates on a single server or, in one embodiment, resides on a distributed system across multiple servers or platforms when system dumps are captured simultaneously.

Library store 510 contains data type descriptions for various types of data. The data type descriptions include a set of rules that describe a layout location of the set of candidate data and are created by administrators, in one embodiment, based on historical knowledge. The data type descriptions include descriptions/characteristics corresponding to the different data types, such as a set of classes representing class ownership hierarchy, and also to which view the rule belongs, such as SQL, HTTP, SOAP, etc. (see FIG. 9 and corresponding text for further details).

Figure 6:
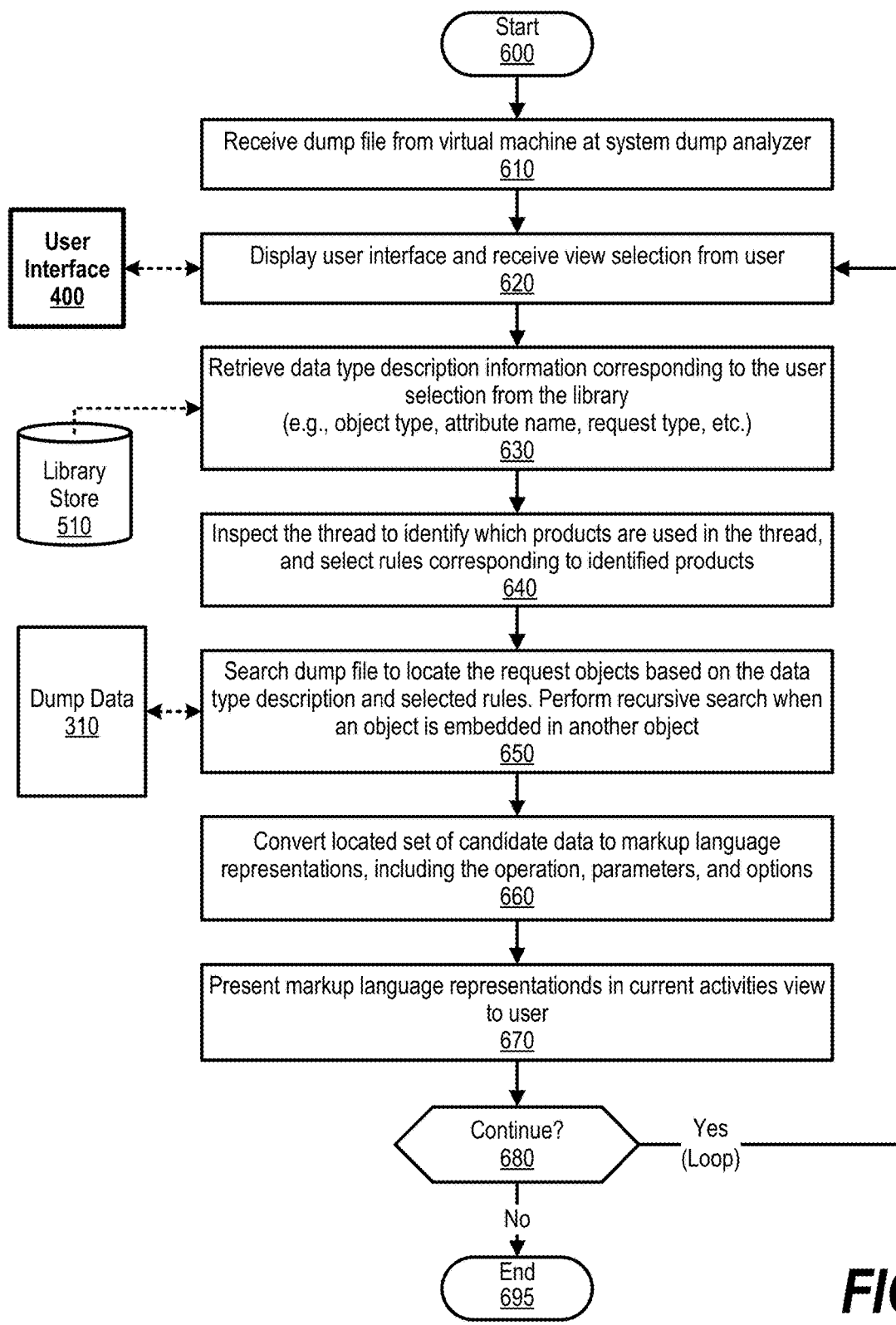
FIG. 6 is a flowchart showing steps taken by a multi-view dump analyzer to display a view of a dump file based on a user's view selection.

Analysis engine 500 receives data type descriptions corresponding to the user's view selection and uses matching rules filters 520 to select rules applicable to the thread in question (see FIG. 6 and corresponding text for further details). In turn, analysis engine 500 passes the selected rules to extraction module 530. Extraction module 530 traverses dump data 310 to locate data structures matching the selected rules' descriptions/characteristics and provides the located data to analysis engine 500, such as operations, parameters, and options associated with request objects.

Analysis engine 500 uses data formatter 540 to convert the data received by extraction module 530 into, for example, a standard markup language format. In turn, multi-view dump analyzer 300 displays the requested views on display 355.

In one embodiment, the original view is a special view that displays a request that triggers/initiates a thread, such as an HTTP request, SQL request, or a mix of different request. In another embodiment, the current view is a request view going to an external process or different thread, such as a last request during the life cycle of a thread stack.

FIG. 6 is a flowchart showing steps taken by a multi-view dump analyzer to display a view of dump data based on a user's view selection. FIG. 6 processing commences at 600 whereupon, at step 610, the process receives dump data 310 from, for example, a virtual machine. At step 620, the process displays user interface 400 and receives one or more view selections from the user. For example, the user may wish to view one view (e.g., HTTP view) or multiple views (e.g., HTTP view and RESTAPI view).

At step 630, the process retrieves data type description information that includes rules corresponding to the user selection from library store 510 (e.g., description, object type, attribute name, request type, and applicable product, etc.) For example, when a user chooses SQL view, all SQL related rules are retrieved (see FIG. 9 and corresponding text for further details).

At step 640, the process inspects the target thread to identify which products are used in the thread and rules that are not in the identified product lists are removed. For example, when a SQL rule is for an Oracle product, and the thread is not related to Oracle, then the rule is not applicable and will be removed for the eventual search in step 650. This step reduces overall search cost.

At step 650, the process searches dump data 310 to locate request objects and other data based on the subset of rules from step 640. In one embodiment, the process recursively searches in dump data 310 when data is embedded in another object.

At step 660, the process converts the located request objects to a markup language representation, including the operation, parameters, and options. At step 670, the process displays the converted dump data in a current activities view to user on a display.

The process determines as to whether continue (decision 680). For example, the user may wish to view a different view to see if the dump data contains information for different request types (e.g., RESTAPI). If the process should continue, then decision 680 branches to the 'yes' branch which loops back to receive another user view selection and process the next view selection. This looping continues until the process should terminate, at which point decision 680 branches to the 'no' branch exiting the loop. FIG. 6 processing thereafter ends at 695.

FIG. 7 is an exemplary diagram depicting an HTTP view. HTTP view 360, in one embodiment, includes columns 700, 710, 720, and 730. Column 700 includes the start times of the individual threads shown in column 720, and column 710 includes the elapsed time of the individual threads. Column 730 includes HTTP specific operation information for HTTP user 350 to view.

FIG. 8 is an exemplary diagram depicting an SQL view. Similar to HTTP view 360, SQL view 375, in one embodiment, includes columns 800, 810, 820, and 830. Column 800 is similar to column 700 and includes the start times of the individual threads shown in column 820 (similar to column 720). Column 810 (similar to column 710) includes the elapsed time of the individual threads. Column 830 includes SQL specific operation information for SQL user 365 to view.

FIG. 9 is an exemplary diagram depicting a data type description with rules that describe a layout location of data corresponding to the data type description. As discussed above, data type descriptions include descriptions and characteristics corresponding to the different data types, such as a set of classes representing class ownership hierarchy, and also to which view the rule belongs, such as SQL, HTTP, SOAP, etc. Data type description 900 includes a set of rules corresponding to an SQL view. Data type description 900 includes two rules 910 and 920 for two different products. As discussed above, matching rules filters 520 evaluates rules 910 and 920 against a current thread to determine which of the rules should be utilized in the search process.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    retrieving a set of dump data generated by a dump event, where the set of dump data comprises both a first set of data corresponding to a first data type and a second set of data corresponding to a second data type;
    receiving a first view selection and a second view selection from a user;
    identifying a first data type description corresponding to the first view selection and identifying a second data type description corresponding to the second view selection;
    matching the first data type description to the first set of data and matching the second data type description to the second set of data;
    converting the first set of data into a first viewable format comprising a first set of markup language representations;
    converting the second set of data into a second viewable format comprising a second set of markup language representations; and
    displaying concurrently the first set of markup language representations in a first window on a display and the second set of markup language representations in a second window on the display.

2. The method of claim 1 wherein the first data type description comprises a set of rules that describe a layout location of the first set of data.

3. The method of claim 2 further comprising:
identifying an object at a location in the dump data that matches the layout location;
determining that an embedded object is embedded in the object, wherein the embedded object corresponds to the first data type description; and
capturing at least a portion of the first set of data from the embedded object.

4. The method of claim 2 further comprising:
selecting a subset of the set of rules in response to evaluating the set of rules against a thread corresponding to the set of dump data; and
utilizing the subset of rules to locate the first set of data.

5. The method of claim 1 wherein the first data type description comprises a set of information selected from the group consisting of an object type, an attribute name, and a request type.

6. The method of claim 1 wherein the dump event is selected from the group consisting of a Java system dump and a Java heap dump.

7. An information handling system comprising:
one or more processors;
a memory coupled to at least one of the processors;
a set of computer program instructions stored in the memory and executed by at least one of the processors in order to perform actions of:
retrieving a set of dump data generated by a dump event, where the set of dump data comprises both a first set of data corresponding to a first data type and a second set of data corresponding to a second data type;
receiving a first view selection and a second view selection from a user;
identifying a first data type description corresponding to the first view selection and identifying a second data type description corresponding to the second view selection;
matching the first data type description to the first set of data and matching the second data type description to the second set of data;
converting the first set of data into a first viewable format comprising a first set of markup language representations;
converting the second set of data into a second viewable format comprising a second set of markup language representations; and
displaying concurrently the first set of markup language representations in a first window on a display and the second set of markup language representations in a second window on the display.

8. The information handling system of claim 7 wherein the first data type description comprises a set of rules that describe a layout location of the first set of data.

9. The information handling system of claim 8 wherein the processors perform additional actions comprising:
identifying an object at a location in the dump data that matches the layout location;
determining that an embedded object is embedded in the object, wherein the embedded object corresponds to the first data type description; and
capturing at least a portion of the first set of data from the embedded object.

10. The information handling system of claim 8 wherein the processors perform additional actions comprising:
selecting a subset of the set of rules in response to evaluating the set of rules against a thread corresponding to the set of dump data; and
utilizing the subset of rules to locate the first set of data.

11. The information handling system of claim 7 wherein the first data type description comprises a set of information selected from the group consisting of an object type, an attribute name, and a request type.

12. The information handling system of claim 7 wherein the dump event is selected from the group consisting of a Java system dump and a Java heap dump.

13. A computer program product stored in a computer readable storage medium, comprising computer program code that, when executed by an information handling system, causes the information handling system to perform actions comprising:
retrieving a set of dump data generated by a dump event, where the set of dump data comprises both a first set of data corresponding to a first data type and a second set of data corresponding to a second data type;
receiving a first view selection and a second view selection from a user;
identifying a first data type description corresponding to the first view selection and identifying a second data type description corresponding to the second view selection;
matching the first data type description to the first set of data and matching the second data type description to the second set of data;
converting the first set of data into a first viewable format comprising a first set of markup language representations;
converting the second set of data into a second viewable format comprising a second set of markup language representations; and
displaying concurrently the first set of markup language representations in a first window on a display and the second set of markup language representations in a second window on the display.

14. The computer program product of claim 13 wherein the first data type description comprises a set of rules that describe a layout location of the first set of data.

15. The computer program product of claim 14 wherein the information handling system performs further actions comprising:
identifying an object at a location in the dump data that matches the layout location;
determining that an embedded object is embedded in the object, wherein the embedded object corresponds to the first data type description; and
capturing at least a portion of the first set of data from the embedded object.

16. The computer program product of claim 14 wherein the information handling system performs further actions comprising:
selecting a subset of the set of rules in response to evaluating the set of rules against a thread corresponding to the set of dump data; and
utilizing the subset of rules to locate the first set of data.

17. The computer program product of claim 13 wherein the first data type description comprises a set of information selected from the group consisting of an object type, an attribute name, and a request type.

* * * * *